US011916439B2

(12) United States Patent
Ohori (10) Patent No.: US 11,916,439 B2
(45) Date of Patent: Feb. 27, 2024

(54) ROTOR, MOTOR, AND WIPER MOTOR HAVING A STRUCTURE FOR FIXING A MAGNET TO A ROTOR CORE

(71) Applicant: MITSUBA Corporation, Gunma (JP)

(72) Inventor: Ryo Ohori, Gunma (JP)

(73) Assignee: MITSUBA Corporation, Gunma (JP)

( * ) Notice: Subject to any disclaimer, the term of this patent is extended or adjusted under 35 U.S.C. 154(b) by 415 days.

(21) Appl. No.: 17/312,004

(22) PCT Filed: Oct. 1, 2019

(86) PCT No.: PCT/JP2019/038725
§ 371 (c)(1),
(2) Date: Jun. 9, 2021

(87) PCT Pub. No.: WO2020/129353
PCT Pub. Date: Jun. 25, 2020

(65) Prior Publication Data
US 2022/0060069 A1 Feb. 24, 2022

(30) Foreign Application Priority Data
Dec. 17, 2018 (JP) .................................. 2018-235805

(51) Int. Cl.
*H02K 1/27* (2022.01)
*H02K 1/278* (2022.01)
(Continued)

(52) U.S. Cl.
CPC ................ *H02K 1/278* (2013.01); *B60S 1/08* (2013.01); *H02K 7/1166* (2013.01); *H02K 21/16* (2013.01); *H02K 29/03* (2013.01)

(58) Field of Classification Search
CPC . B60S 1/08; H02K 1/27; H02K 1/278; H02K 7/1166; H02K 21/16; H02K 29/03
(Continued)

(56) References Cited

U.S. PATENT DOCUMENTS

2009/0315424 A1 12/2009 Vollmer
2012/0001509 A1* 1/2012 Yamada ................. H02K 1/278
310/156.15
(Continued)

FOREIGN PATENT DOCUMENTS

JP H02111238 4/1990
JP H02211031 8/1990
(Continued)

OTHER PUBLICATIONS

"Written Opinion of the International Searching Authority (Form PCT/ISA/237) of PCT/JP2019/038725," dated Dec. 17, 2019, with English translation thereof, pp. 1-17.
(Continued)

*Primary Examiner* — Rashad H Johnson
(74) *Attorney, Agent, or Firm* — JCIPRNET (57) ABSTRACT

Provided are a rotor, a motor, and a wiper motor. An arc center of an outer circumferential surface of a rotor core and an arc center of an inner circumferential surface of a permanent magnet are off-centered radially outward from a rotational axis, with the circumferential center disposed on the radially outermost side. An angle formed by salient pole side surfaces facing each other of circumferentially adjacent two salient poles is equal to an angle formed by magnet side surfaces on both sides circumferentially of the permanent magnet. When the distance between the outer circumferential surface of the rotor core and the radially outermost end of the salient poles is Lt, and the distance between the inner circumferential surface of the permanent magnet and the radially outermost end of the magnet side surfaces is Lme, the distances Lt, Lme are set such that the relationship Lme<Lt is satisfied.

3 Claims, 7 Drawing Sheets

(51) Int. Cl.
  *B60S 1/08* (2006.01)
  *H02K 7/116* (2006.01)
  *H02K 21/16* (2006.01)
  *H02K 29/03* (2006.01)

(58) Field of Classification Search
  USPC .......................................................... 310/83
  See application file for complete search history.

(56) References Cited

U.S. PATENT DOCUMENTS

| | | | | |
|---|---|---|---|---|
| 2014/0184009 A1* | 7/2014 | Taniguchi | ............ | H02K 1/2746 |
| | | | | 310/156.53 |
| 2016/0254713 A1 | 9/2016 | Yamaguchi et al. | | |
| 2017/0117765 A1* | 4/2017 | Nishifukumoto | ...... | H02K 1/278 |
| 2018/0219438 A1* | 8/2018 | Oikawa | ................ | H02K 1/2746 |
| 2021/0384783 A1* | 12/2021 | Ohori | .................... | H02K 1/2791 |
| 2022/0060069 A1* | 2/2022 | Ohori | .................... | H02K 7/1166 |
| 2022/0255380 A1* | 8/2022 | Miyawaki | .............. | H02K 1/278 |
| 2023/0063523 A1* | 3/2023 | Aso | ........................ | H02K 15/03 |
| 2023/0253838 A1* | 8/2023 | Amaya | .................. | H02K 21/16 |
| | | | | 310/156.56 |

FOREIGN PATENT DOCUMENTS

| | | |
|---|---|---|
| JP | H03117338 | 5/1991 |
| JP | 2002262533 | 9/2002 |
| JP | 2013066370 | 4/2013 |
| JP | 2015029381 | 2/2015 |
| JP | 2018183013 | 11/2018 |
| WO | 2015102047 | 7/2015 |

OTHER PUBLICATIONS

"Search Report of Europe Counterpart Application", dated Oct. 31, 2022, p. 1-p. 7.
"International Search Report (Form PCT/ISA/210) of PCT/JP2019/038725," dated Dec. 17, 2019, with English translation thereof, pp. 1-4.

* cited by examiner

ROTOR, MOTOR, AND WIPER MOTOR HAVING A STRUCTURE FOR FIXING A MAGNET TO A ROTOR CORE

CROSS-REFERENCE TO RELATED APPLICATION

This application is a 371 application of the International PCT application serial no. PCT/JP2019/038725, filed on Oct. 1, 2019, which claims the priority benefits of Japan Patent Application No. 2018-235805, filed on Dec. 17, 2018. The entirety of each of the above-mentioned patent applications is hereby incorporated by reference herein and made a part of this specification.

BACKGROUND

Technical Field

The invention relates to a rotor, a motor, and a wiper motor.

Description of Related Art

Conventionally, a SPM (surface permanent magnet) type rotor is known, in which a plurality of permanent magnets for a magnetic field are arranged side by side in the circumferential direction on an outer circumferential surface of a rotor core. Among SPM type rotors of this type, a so-called inset type rotor is also known, which includes a plurality of salient poles protruding radially outward from the outer circumferential surface of the rotor core and arranged between circumferentially adjacent permanent magnets. In this type of inset type rotor, the rotor core and the salient poles are made of a magnetic material. Since the protruding direction of the salient poles of the rotor core is radially outward, it is a direction that the interlinkage magnetic flux generated by a coil of a stator tends to flow. In addition, the salient poles generate a reluctance torque that rotates the rotor core so as to reduce the magnetic resistance (reluctance) of the magnetic path of the interlinkage magnetic flux.

Further, due to manufacturing errors of the permanent magnets or the rotor core, the circumferential width of the permanent magnet may be larger than the width between circumferentially adjacent salient poles. In such a case, if the permanent magnet is forcibly arranged on the outer circumferential surface of the rotor core, an extra stress may be applied to the permanent magnet and damage the permanent magnet. Therefore, in many cases, the circumferential width of the permanent magnet is set to be smaller than the width between circumferentially adjacent salient poles. Also, in order to increase the rotational torque of the permanent magnet to the rotor core, the radial wall thickness of the permanent magnet may be gradually increased toward the circumferential center for the circumferential center of the permanent magnet to protrude to the radially outermost side.

RELATED ART

Patent Document

[Patent Document 1] International Publication No. 2015/102047

SUMMARY

Problems to be Solved

As a method of fixing the permanent magnet to the rotor core, a magnet cover may be provided to cover the outer circumferential surface of the permanent magnet, and the permanent magnet may be fixed to the rotor core by the magnet cover. Here, as in the related art described above, if the circumferential width of the permanent magnet is set to be smaller than the width between circumferentially adjacent salient poles, when the permanent magnet is fixed to the rotor core by the magnet cover, the permanent magnet may rattle by the gap between the permanent magnet and the salient poles and increase the operating noise. Even if the permanent magnet is fixed to the rotor core using an adhesive, the adhesive may peel off and the permanent magnet may rattle. In addition, the rotor characteristics may deteriorate due to displacement of the permanent magnet. Furthermore, as in the related art described above, if the radial wall thickness of the permanent magnet is gradually increased toward the circumferential center, there is a problem that the material cost for the permanent magnet increases.

Therefore, the invention provides a rotor, a motor, and a wiper motor that can suppress an increase in operating noise and deterioration in rotor characteristics, and reduce the material cost for permanent magnets.

Means for Solving the Problems

In order to solve the above problems, a rotor according to the invention includes a shaft rotating around a rotational axis; a rotor core fixed to the shaft and rotating with the rotational axis as a center in a radial direction; a plurality of permanent magnets arranged side by side in a circumferential direction on an outer circumferential surface of the rotor core; and a plurality of salient poles formed in a rectangular shape that is long in the radial direction as viewed from a direction of the rotational axis, protruding outward in the radial direction from the outer circumferential surface of the rotor core, and arranged between the permanent magnets adjacent to each other in the circumferential direction. An arc center of the outer circumferential surface of the rotor core between the plurality of salient poles is displaced outward in the radial direction and off-centered from the rotational axis in a manner that a center in the circumferential direction between the salient poles adjacent to each other in the circumferential direction on the outer circumferential surface of the rotor core protrudes to an outermost side in the radial direction. The permanent magnet has an inner circumferential surface in an arc shape on an inner side in the radial direction as viewed from the direction of the rotational axis, and an outer circumferential surface in an arc shape on an outer side in the radial direction as viewed from the direction of the rotational axis, and is formed line-symmetrically with the center in the circumferential direction as a center. An arc center of the inner circumferential surface of the permanent magnet is displaced outward in the radial direction and off-centered from the rotational axis so as to correspond to the outer circumferential surface of the rotor core. An angle formed by side surfaces facing each other of two salient poles adjacent to each other in the circumferential direction is the same as an angle formed by side surfaces on both sides in the circumferential direction of the permanent magnet facing the side surfaces of the salient poles in the circumferential direction. When a distance between the outer circumferential surface of the rotor core and an outermost end of the salient pole in the radial direction is Lt and a distance between the inner circumferential surface of the permanent magnet and an outermost end in the radial direction on the side surface of the permanent magnet is Lme, the distances Lt and Lme are set to satisfy Lme<Lt.

With this configuration, even if the circumferential width of the permanent magnet is smaller than the width between the circumferentially adjacent salient poles, the backlash between the salient pole and the permanent magnet prevents the side surface of the permanent magnet from coming into surface contact with the side surface of the salient pole, and only the radially outermost side of the side surface of the magnet comes into contact with the salient pole. Therefore, even if the circumferential width of the permanent magnet is smaller than the width between the circumferentially adjacent salient poles, the circumferential movement range of the permanent magnet can be narrowed. Thus, an increase in operating noise and deterioration in rotor characteristics can be suppressed. Further, since the arc center of the inner circumferential surface of the permanent magnet is displaced radially outward, the wall thickness on the side of the inner circumferential surface of the permanent magnet can be cut correspondingly as compared with the conventional art. In other words, the radial wall thickness of the permanent magnet can be reduced. Therefore, the material cost for the permanent magnet can be reduced.

A motor according to the invention includes a stator including an annular stator core, and a plurality of teeth protruding inward in the radial direction from an inner circumferential surface of the stator core; coils mounted on the teeth; and the above-described rotor arranged on the inner side in the radial direction with respect to the plurality of teeth. The rotor is rotated in both clockwise and counterclockwise directions as viewed from the direction of the rotational axis.

In such a motor in which the rotor rotates in both directions, circumferential rattling of the permanent magnet can be suppressed to suppress an increase in operating noise, so the motor can be particularly preferably used.

A wiper motor according to the invention includes the above-described motor; and a deceleration part decelerating and outputting rotation of the shaft.

With this configuration, the wiper motor that can suppress an increase in operating noise and deterioration in rotor characteristics and reduce the material cost for permanent magnet can be provided.

Effects

According to the invention, even if the circumferential width of the permanent magnet is smaller than the width between the circumferentially adjacent salient poles, the backlash between the salient pole and the permanent magnet prevents the side surface of the permanent magnet from coming into surface contact with the side surface of the salient pole, and only the radially outermost side of the side surface of the magnet comes into contact with the salient pole. Therefore, even if the circumferential width of the permanent magnet is smaller than the width between the circumferentially adjacent salient poles, the circumferential movement range of the permanent magnet can be narrowed. Thus, an increase in operating noise and deterioration in rotor characteristics can be suppressed. Further, since the arc center of the inner circumferential surface of the permanent magnet is displaced radially outward, the wall thickness on the side of the inner circumferential surface of the permanent magnet can be cut correspondingly as compared with the conventional art. In other words, the radial wall thickness of the permanent magnet can be reduced. Therefore, the material cost for the permanent magnet can be reduced.

DESCRIPTION OF THE EMBODIMENTS

Next, an embodiment of the invention will be described with reference to the drawings.

(Wiper Motor)

Figure 1:
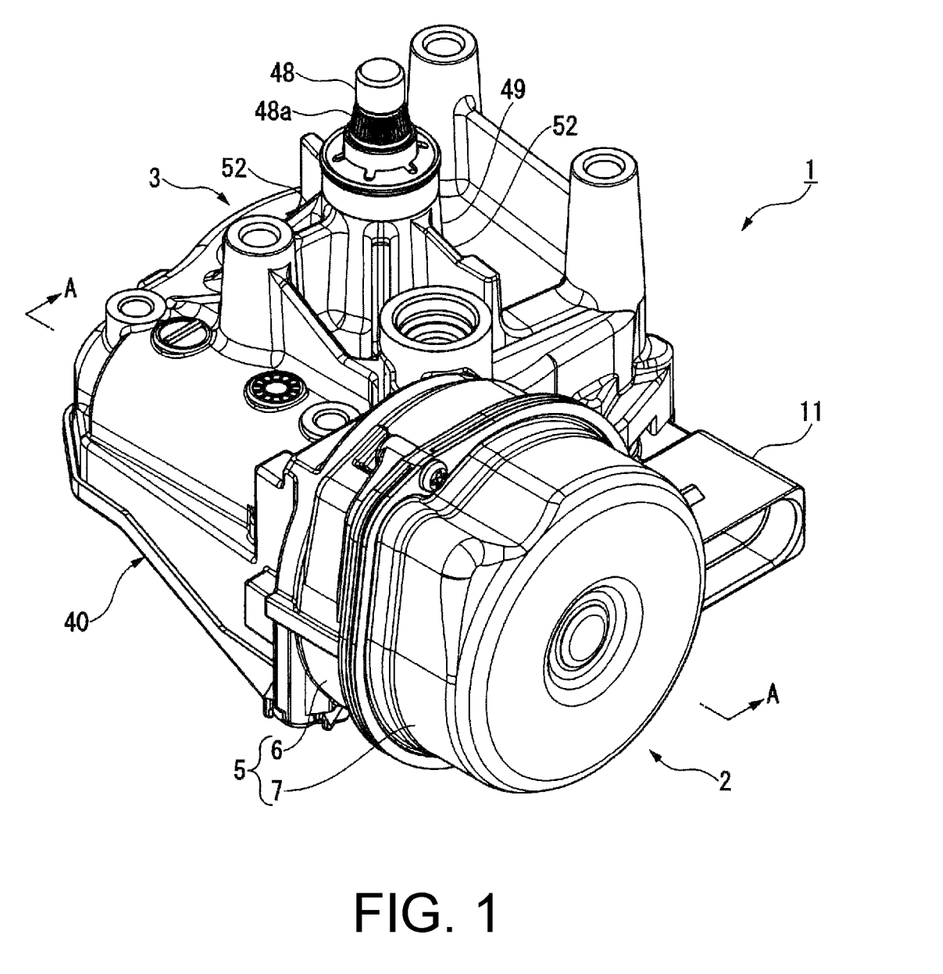
FIG. 1 is a perspective view of the wiper motor according to an embodiment of the invention.
Figure 2:
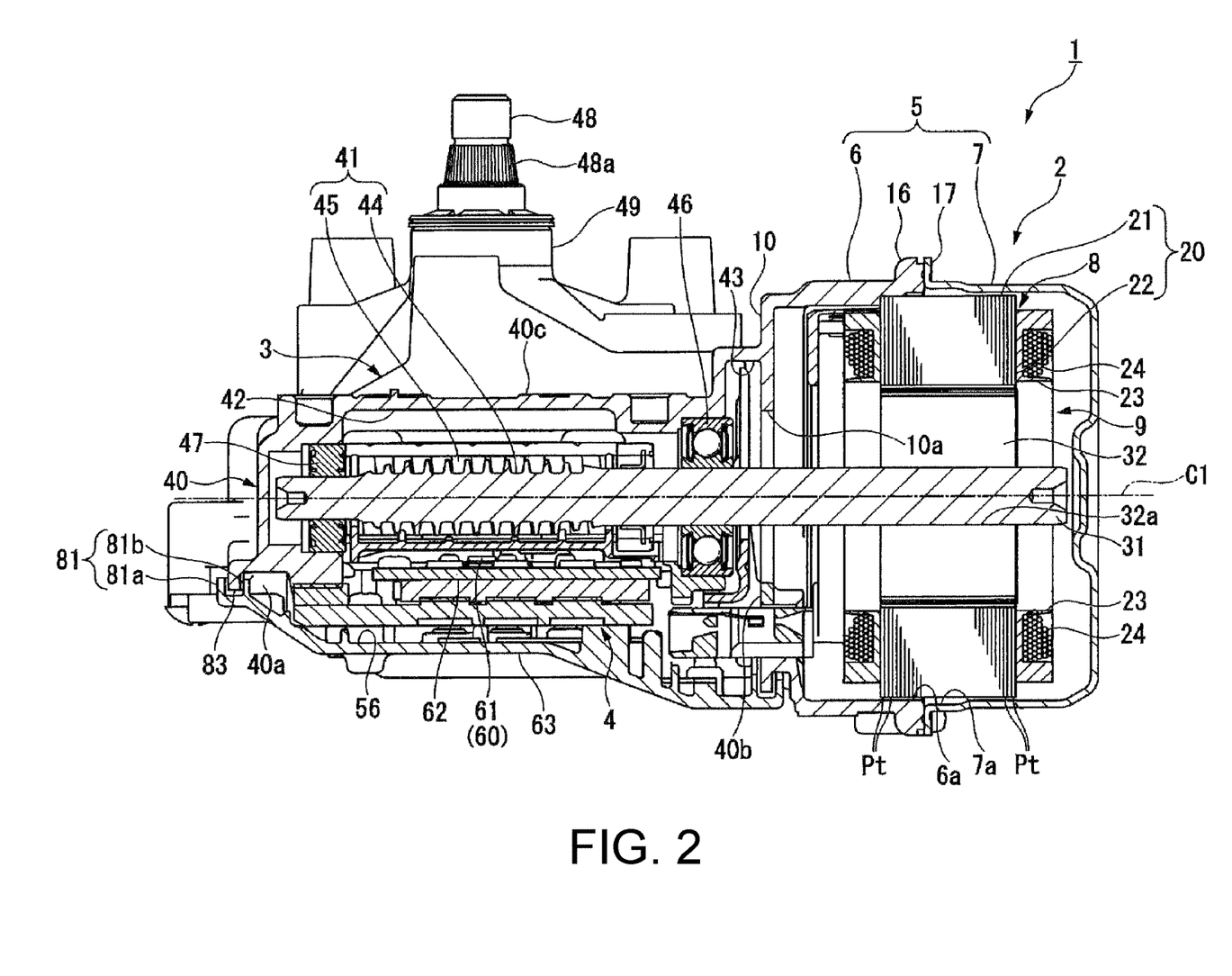
FIG. 2 is a cross-sectional view taken along the line A-A of FIG. 1.

FIG. 1 is a perspective view of a wiper motor 1. FIG. 2 is a cross-sectional view taken along the line A-A of FIG. 1. As shown in FIG. 1 and FIG. 2, the wiper motor 1 serves as a drive source for a wiper mounted on a vehicle, for example. The wiper motor 1 includes a motor part (motor) 2, a deceleration part 3 that decelerates and outputs the rotation of the motor part 2, and a controller part 4 that controls the drive of the motor part 2. In the following description, the term "axial direction" refers to the direction of a rotational axis C1 of a shaft 31 of the motor part 2, the term "circumferential direction" refers to the circumferential direction of the shaft 31, and the term "radial direction" refers to the radial direction of the shaft 31.

(Motor Part)

The motor part 2 includes a motor case 5, a substantially cylindrical stator 8 housed in the motor case 5, and a rotor 9 provided on the radially inner side of the stator 8 and provided to be rotatable with respect to the stator 8. The motor part 2 is a so-called brushless motor that does not require a brush to supply electric power to the stator 8.

(Motor Case)

The motor case 5 is made of a material having excellent heat dissipation, such as aluminum die cast. The motor case 5 includes a first motor case 6 and a second motor case 7 which are configured so that they can be divided in the axial direction. The first motor case 6 and the second motor case 7 are each formed in a bottomed cylindrical shape. The first motor case 6 is integrally molded with a gear case 40 in a manner that a bottom portion 10 is joined to the gear case 40 of the deceleration part 3. A through hole 10a through which the shaft 31 of the rotor 9 can be inserted is formed at the substantially radial center of the bottom portion 10.

In addition, an outer flange portion 16 projecting radially outward is formed at an opening 6a of the first motor case 6. Further, an outer flange portion 17 projecting radially outward is formed at an opening 7a of the second motor case 7. The outer flange portions 16 and 17 are butted against each other to form the motor case 5 having an internal space. Then, in the internal space of the motor case 5, the outer circumferential surface of the stator 8 is fitted to the inner circumferential surfaces of the first motor case 6 and the second motor case 7.

(Stator)

Figure 3:
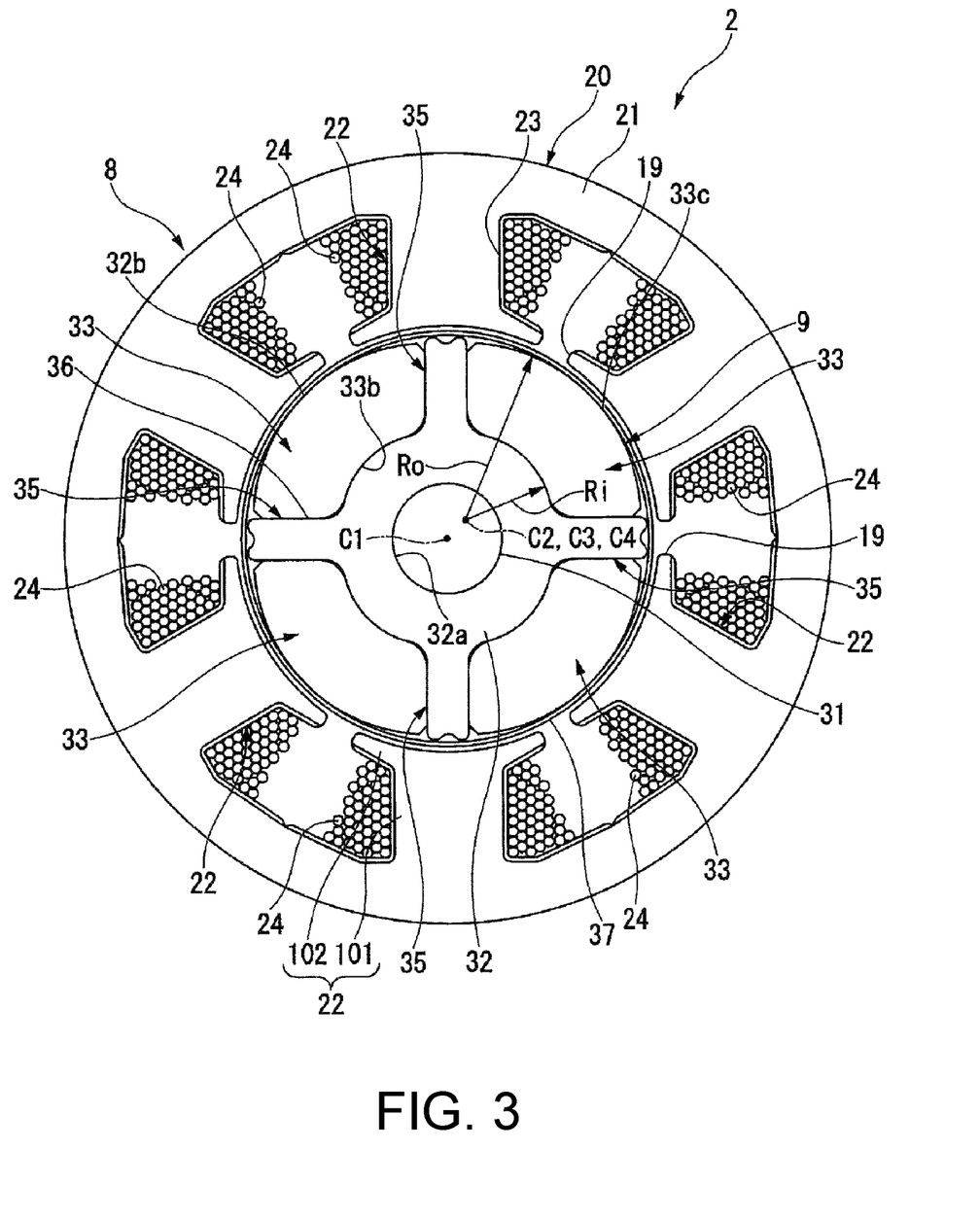
FIG. 3 is a cross-sectional view taken along the radial direction of the stator and the rotor according to an embodiment of the invention.

FIG. 3 is a cross-sectional view taken along the radial direction of the stator 8 and the rotor 9. As shown in FIG. 2 and FIG. 3, the stator 8 has a stator core 20 in which a cylindrical core portion 21 having a substantially annular cross-sectional shape along the radial direction and a plurality of teeth 22 (for example, six in the present embodiment) protruding radially inward from the core portion 21 are integrally molded. The stator core 20 is formed by laminating a plurality of metal plates in the axial direction. Nevertheless, the stator core 20 is not necessarily formed by laminating a plurality of metal plates in the axial direction, and may be formed by, for example, pressure molding soft magnetic powder.

The tooth 22 is integrally formed with a tooth body 101 protruding in the radial direction from the inner circumferential surface of the core portion 21, and a collar portion 102 extending in the circumferential direction from a radially inner end of the tooth body 101. The collar portion 102 is formed to extend from the tooth body 101 toward both sides in the circumferential direction. Then, a slot 19 is formed between the circumferentially adjacent collar portions 102.

In addition, the inner circumferential surface of the core portion 21 and the teeth 22 are covered with an insulator 23 made of resin. A coil 24 is wound around each tooth 22 from above the insulator 23. Each coil 24 generates a magnetic field for rotating the rotor 9 by receiving power supply from the controller part 4.

(Rotor)

Figure 4:
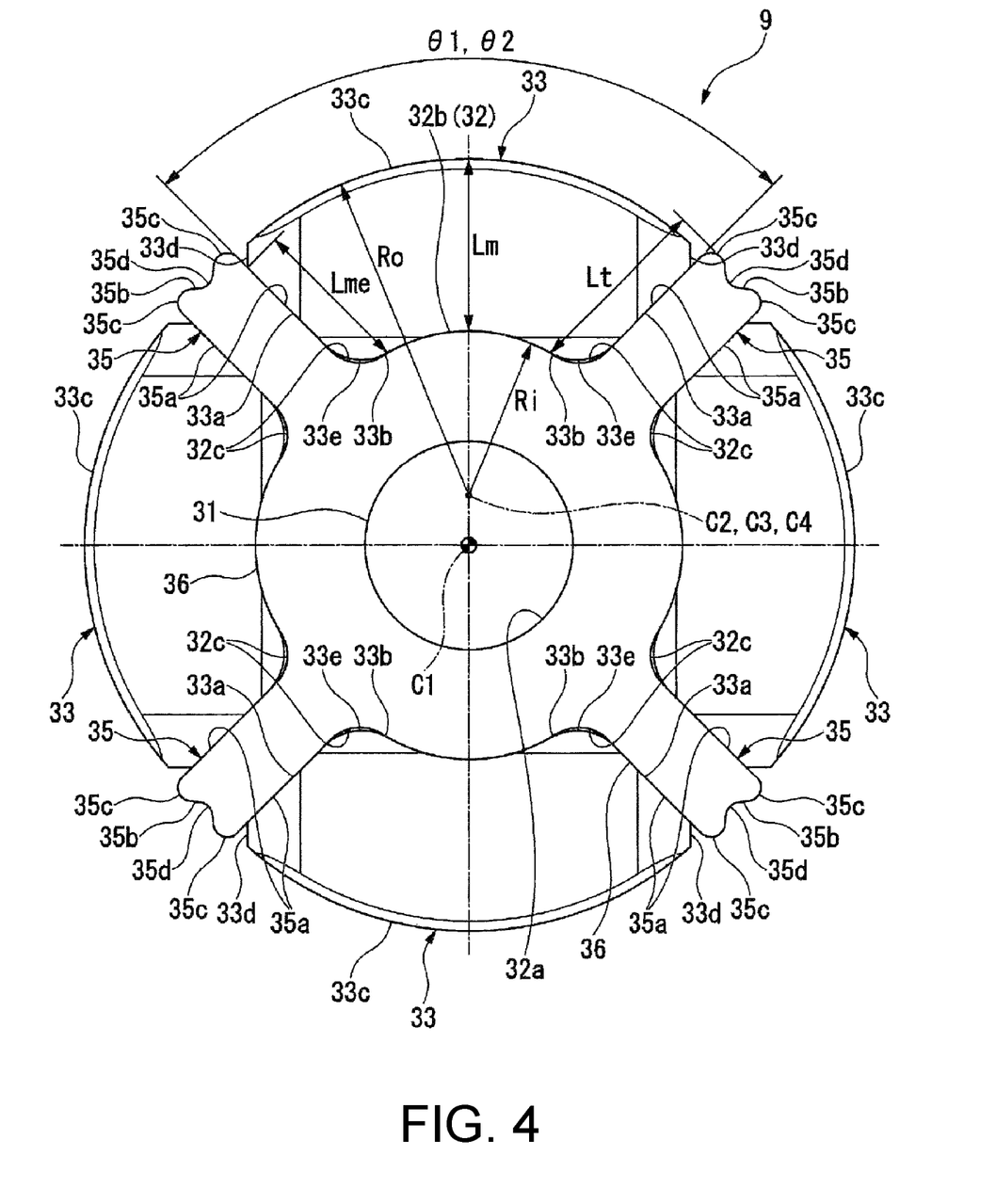
FIG. 4 is a plan view of the rotor according to an embodiment of the invention as viewed from the axial direction.

FIG. 4 is a plan view of the rotor 9 as viewed from the axial direction. As shown in FIG. 3 and FIG. 4, the rotor 9 is rotatably provided on the radially inner side of the stator 8 via a minute gap. The rotor 9 includes a shaft 31 integrally molded with a worm shaft 44 (see FIG. 2) constituting the deceleration part 3, a substantially columnar rotor core 32 fitted and fixed to the outer circumferential surface of the shaft 31 and using the axis of the shaft 31 as the rotational axis C1, and four permanent magnets 33 provided on the outer circumferential surface of the rotor core 32. As described above, in the motor part 2, the ratio of the number of magnetic poles of the permanent magnets 33 to the number of the slots 19 (teeth 22) is 4:6.

The rotor core 32 is formed by laminating a plurality of metal plates in the axial direction. Nevertheless, the rotor core 32 is not necessarily formed by laminating a plurality of metal plates in the axial direction, and may be formed, for example, by pressure molding soft magnetic powder. Further, a through hole 32a penetrating in the axial direction is formed at the substantially radial center of the rotor core 32. The shaft 31 is press-fitted into the through hole 32a. The shaft 31 may be inserted into the through hole 32a, and the rotor core 32 may be fixed to the shaft 31 using an adhesive or the like.

Further, four salient poles 35 are provided on the outer circumferential surface 32b of the rotor core 32 at equal intervals in the circumferential direction. The salient pole 35 is formed to protrude radially outward and extend over the entire rotor core 32 in the axial direction. The salient pole 35 is formed in a rectangular shape that is long in the radial direction as viewed from the axial direction, and has salient pole side surfaces 35a on both sides in the circumferential direction and a tip surface 35b on the radially outer side. On the tip surface 35b of the salient pole 35, round chamfered portions 35c are formed at corners on both sides in the circumferential direction over the entire axial direction. Further, on the tip surface 35b of the salient pole 35, a recess 35d is formed at the circumferential center over the entire axial direction.

An arc portion 32c is formed at the base of the salient pole 35, that is, at the connecting portion between the salient pole side surface 35a of the salient pole 35 and the outer circumferential surface 32b. The salient pole side surface 35a and the outer circumferential surface 32b are connected via the arc portion 32c. An arc center C2 of the outer circumferential surface 32b of the rotor core 32 is displaced radially outward and off-centered from the rotational axis C1 in a manner that the circumferential center between the circumferentially adjacent salient poles 35 on the outer circumferential surface 32b protrudes to the radially outermost side. The outer circumferential surface 32b of the rotor core 32 formed in this way is configured as a magnet housing portion 36 between two circumferentially adjacent salient poles 35. The permanent magnets 33 are respectively arranged in the magnet housing portions 36.

The permanent magnet 33 is, for example, a ferrite magnet. The permanent magnet 33 is formed in a substantially arc shape as viewed from the axial direction, and is formed line-symmetrically with the circumferential center as the center. The permanent magnet 33 has a flat magnet side surface 33a facing the salient pole side surface 35a in the circumferential direction, an arc-shaped inner circumferential surface 33b on the radially inner side, an arc-shaped outer circumferential surface 33c on the radially outer side, a parallel surface 33d formed at the connecting portion between the magnet side surface 33a and the outer circumferential surface 33c and formed parallel on both sides in the circumferential direction, and a round chamfered portion 33e formed at the connecting portion between the magnet side surface 33a and the inner circumferential surface 33b.

The inner circumferential surface 33b of the permanent magnet 33 is formed in the same manner as the outer circumferential surface 32b of the rotor core 32. An arc center C3 of the inner circumferential surface 33b of the permanent magnet 33 coincides with the arc center C2 of the outer circumferential surface 32b of the rotor core 32. The circumferential center of the inner circumferential surface 33b of the permanent magnet 33 protrudes to the radially outermost side. An arc center C4 of the outer circumferential surface 33c of the permanent magnet 33 is also displaced radially outward and off-centered from the rotational axis C1. The outer circumferential surface 33c is formed in a manner that the circumferential center protrudes to the radially outermost side.

Here, it is set that when the radius of curvature of the inner circumferential surface 33b of the permanent magnet 33 is Ri, and the radius of curvature of the outer circumferential surface 33c is Ro, the radii of curvature Ri and Ro satisfy: Ro>Ri . . . (1). Then, the arc center C4 of the outer circumferential surface 33c of the permanent magnet 33 coincides with the arc center C3 of the inner circumferential surface 33b of the permanent magnet 33 and the arc center C2 of the outer circumferential surface 32b of the rotor core 32. In addition, it is set that when the angle formed by the salient pole side surfaces 35a facing each other of the circumferentially adjacent salient poles 35 is θ1, and the angle formed by the magnet side surfaces 33a on both sides of the permanent magnet 33 in the circumferential direction is θ2, the angles θ1 and θ2 satisfy; θ1≈θ2 . . . (2).

Further, it is set that when the distance between the outer circumferential surface 32b of the rotor core 32 and the radially outermost end of the salient pole side surface 35a of the permanent magnet 33, that is, the distance between the outer circumferential surface 32b excluding the arc portion 32c of the rotor core 32 and the radially outermost end of the salient pole 35, is Lt, the distance between the inner circumferential surface 33b of the permanent magnet 33 and the radially outermost end of the magnet side surface 33a is Lme, and the radial wall thickness at the circumferential center of the permanent magnet 33 is Lm, the distances Lt and Line and the wall thickness Lm satisfy: Lme<Lm<Lt . . . (3).

The permanent magnet 33 is arranged in the magnet housing portion 36 of the rotor core 32 and then fixed by a magnet cover 37. The magnet cover 37 is formed to cover the outer circumferential surface 33c of the permanent magnet 33. The magnet cover 37 is formed by pressing a thin plate of magnetic material. In addition to the magnet cover 37, the permanent magnet 33 may be attached to the rotor core 32 using an adhesive or the like (not shown). With this configuration, the permanent magnet 33 can be firmly fixed to the rotor core 32.

(Circumferential Rattling of the Permanent Magnet)

Figure 5:
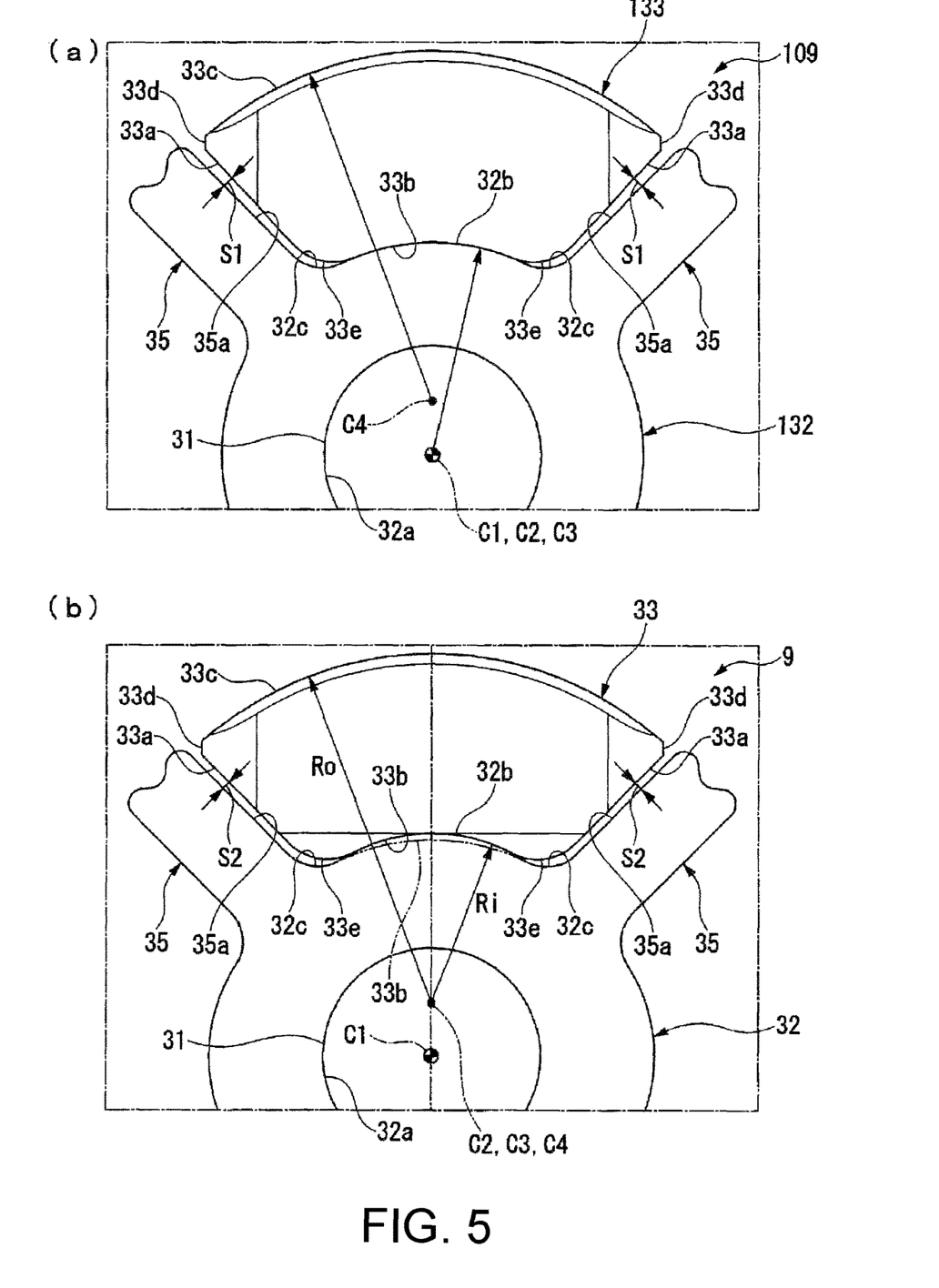
FIG. 5 is a plan view enlarging a part of the rotor as viewed from the axial direction, wherein (a) shows the conventional rotor and (b) shows the rotor of the present embodiment.

Next, based on (a) of FIG. 5 to (a) of FIG. 7, the circumferential rattling of the permanent magnet 33 of the rotor 9 of the present embodiment will be described in comparison with the circumferential rattling of the permanent magnet 133 of the conventional rotor 109. FIG. 5 is a plan view enlarging a part of the rotor as viewed from the axial direction, wherein (a) shows a conventional rotor 109 and (b) shows the rotor 9 of the present embodiment. (a) and (b) of FIG. 5 correspond to FIG. 4 described above. In the following description, in order to avoid repetition of the description of the permanent magnet 33 in the present embodiment, each portion of the rotor core 132 and the permanent magnet 133 in the conventional rotor 109 will be described with the same name and the same reference numeral as each portion of the rotor core 32 and the permanent magnet 33 in the rotor 9 of the present embodiment.

As previously mentioned, in the rotor 9 of the present embodiment, the arc center C2 of the outer circumferential surface 32b of the rotor core 32 and the arc center C3 of the inner circumferential surface 33b of the permanent magnet 33 are displaced radially outward and off-centered from the rotational axis C1. In contrast thereto, as shown in (a) of FIG. 5, in the conventional rotor 109, the arc center C2 of the outer circumferential surface 32b of the rotor core 132 and the arc center C3 of the inner circumferential surface 33b of the permanent magnet 133 are not off-centered and coincide with the rotational axis C1. As shown in (a) of FIG. 5, a gap S1 is formed between the magnet side surface 33a on both sides of the conventional permanent magnet 133 in the circumferential direction and the salient pole side surface 35a facing the magnet side surface 33a in the circumferential direction. Further, as shown in (b) of FIG. 5, a gap S2 is formed between the magnet side surface 33a on both sides of the permanent magnet 33 of the present embodiment in the circumferential direction and the salient pole side surface 35a facing the magnet side surface 33a in the circumferential direction. These gaps S1 and S2 have the same dimensions.

Figure 6:
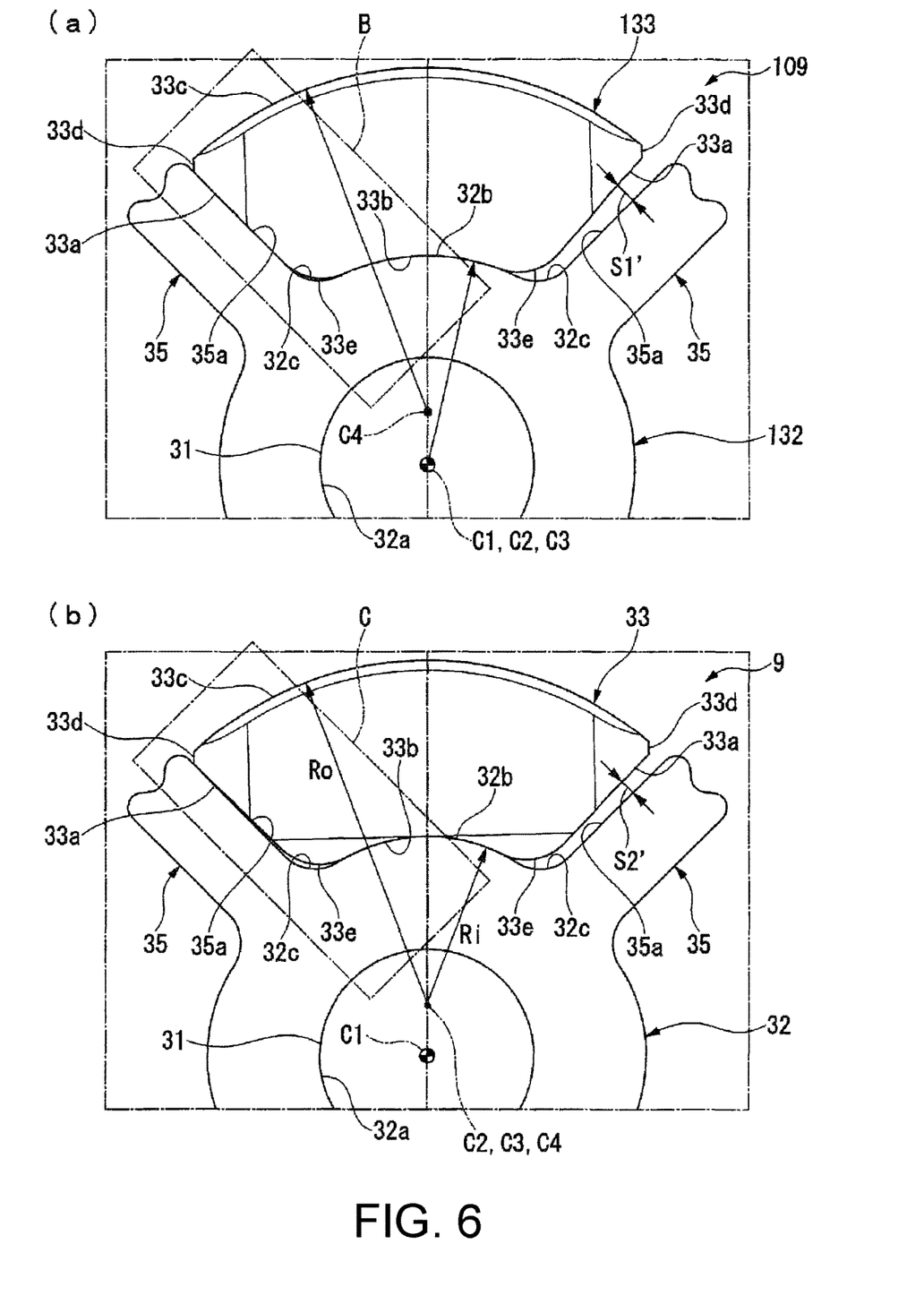
FIG. 6 is an explanatory view of circumferential rattling of the permanent magnet, wherein (a) shows the conventional rotor and (b) shows the rotor of the present embodiment.

FIG. 6 is an explanatory view of circumferential rattling of the permanent magnet, wherein (a) shows the conventional rotor 109 and (b) shows the rotor 9 of the present embodiment. (a) of FIG. 6 corresponds to (a) of FIG. 5 described above. (b) of FIG. 6 corresponds to (b) of FIG. 5 described above. (a) of FIG. 7 is an enlarged view of the portion B of (a) of FIG. 6. (b) of FIG. 7 is an enlarged view of the portion C of (b) of FIG. 6. Under the above configuration, as shown in (a) and (b) of FIG. 6, when the permanent magnets 33 and 133 are brought close to the side of one of the two circumferentially adjacent salient poles 35, the magnet side surface 33a of each of the permanent magnets 33 and 133 is brought into contact with the salient pole side surface 35a. How the magnet side surface 33a comes into contact with the salient pole side surface 35a at this time differs between the present embodiment and the conventional art.

Figure 7:
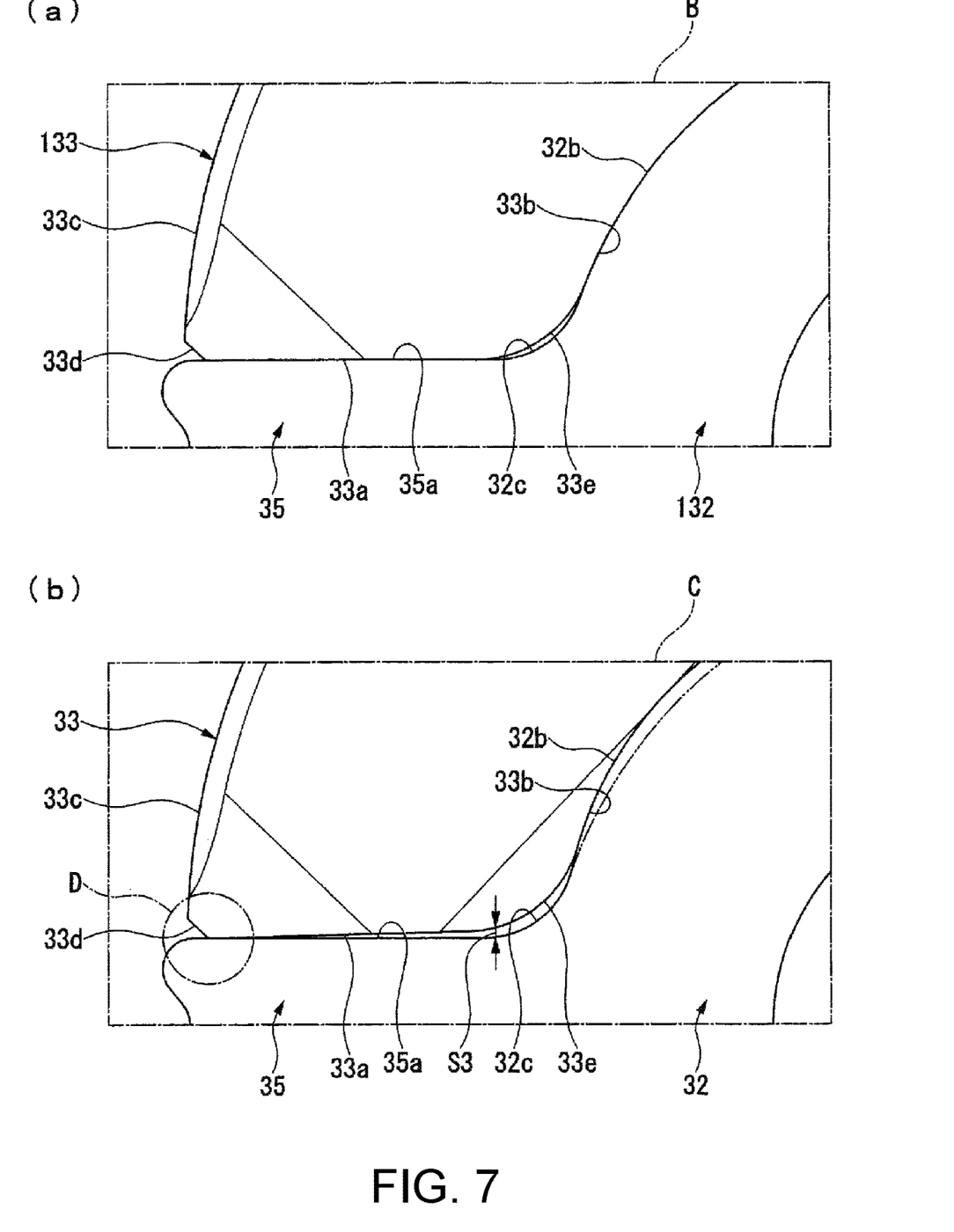
FIG. 7 shows a part of the rotor, wherein (a) is an enlarged view of the portion B of (a) of FIG. 6 and (b) is an enlarged view of the portion C of (b) of FIG. 6.

That is, with respect to the contact area of the magnet side surface 33a with the salient pole side surface 35a in the conventional rotor 109 as shown in (a) of FIG. 7, the contact area of the magnet side surface 33a with the salient pole side surface 35a in the rotor 9 of the present embodiment as shown in (b) of FIG. 7 is small. More specifically, in the rotor 9 of the present embodiment, only the radially outer portion of the magnet side surface 33a comes into contact with the salient pole side surface 35a (see the portion D of (b) of FIG. 7). This is because the arc center C2 of the outer circumferential surface 32b of the rotor core 32 and the arc center C3 of the inner circumferential surface 33b of the permanent magnet 33 in the present embodiment are displaced radially outward and off-centered from the rotational axis C1.

In other words, if the arc centers C2 and C3 are off-centered in this way, the radii of curvature of the outer circumferential surface 32b of the rotor core 32 and the inner circumferential surface 33b of the permanent magnet 33 become small as compared with the conventional art. Therefore, when the permanent magnet 33 is brought close to the salient pole 35, the inclination of the magnet side surface 33a with respect to the salient pole side surface 35a becomes large. As a result, as shown in (b) of FIG. 7, in the rotor 9 of the present embodiment, a gap S3 remains between the radially inner side of the salient pole side surface 35a and the radially inner side of the magnet side surface 33a in a state where the magnet side surface 33a is brought into contact with the salient pole side surface 35a.

Here, in the rotor 9 of the present embodiment, the angle θ1 formed by the salient pole side surfaces 35a facing each other of the circumferentially adjacent salient poles 35 and the angle θ2 formed by the magnet side surfaces 33a on both sides of the permanent magnet 33 in the circumferential direction are set to satisfy the above formula (2). Further, the distance Lt between the outer circumferential surface 32b of the rotor core 32 and the radially outermost end of the salient pole 35 and the distance Lme between the inner circumferential surface 33b of the permanent magnet 33 and the radially outermost end of the magnet side surface 33a are set to satisfy the above formula (3). Therefore, when the permanent magnet 33 approaches the salient pole 35, the radially outer portion of the magnet side surface 33a is reliably brought into contact with the salient pole 35.

Accordingly, when the permanent magnets 33 and 133 are brought close to the salient pole 35, with respect to a gap S1' between the salient pole side surface 35a and the magnet side surface 33a in the conventional rotor 109 as shown in (a) of FIG. 6, a gap S2' between the salient pole side surface 35a and the magnet side surface 33a in the rotor 9 of the present embodiment as shown in (b) of FIG. 6 is small. Therefore, the circumferential rattling of the permanent magnet 33 in the rotor 9 of the present embodiment is smaller than that of the conventional rotor 109.

(Deceleration Part)

Returning to FIG. 1 and FIG. 2, the deceleration part 3 includes the gear case 40 to which the motor case 5 is attached, and a worm deceleration mechanism 41 housed in the gear case 40. The gear case 40 is made of a material having excellent heat dissipation such as aluminum die cast. The gear case 40 is formed in a box shape having an opening 40a on one surface, and has a gear housing portion 42 housing the worm deceleration mechanism 41 inside. Further, on a side wall 40b of the gear case 40, an opening 43 for communicating the through hole 10a of the first motor case 6 and the gear housing portion 42 is formed at a portion where the first motor case 6 is integrally molded.

Further, a substantially cylindrical bearing boss 49 is disposed to protrude from a bottom wall 40c of the gear case 40. The bearing boss 49 rotatably supports an output shaft 48 of the worm deceleration mechanism 41. A slide bearing (not shown) is provided on the inner circumferential surface of the bearing boss 49. An O-ring (not shown) is mounted on the inner peripheral edge of the tip of the bearing boss 49. Thus, dust and water are prevented from entering from the outside to the inside via the bearing boss 49. A plurality of ribs 52 are provided on the outer circumferential surface of the bearing boss 49. As a result, the rigidity of the bearing boss 49 is ensured.

The worm deceleration mechanism 41 housed in the gear housing portion 42 is composed of a worm shaft 44 and a worm wheel 45 meshed with the worm shaft 44. The worm shaft 44 is arranged coaxially with the shaft 31 of the motor part 2. Then, the worm shaft 44 is rotatably supported at both ends by bearings 46 and 47 provided in the gear case 40. The end of the worm shaft 44 on the side of the motor part 2 protrudes through the bearing 46 to the opening 43 of the gear case 40. The protruding end of the worm shaft 44 and the end of the shaft 31 of the motor part 2 are joined, and the worm shaft 44 and the shaft 31 are integrated. The worm shaft 44 and the shaft 31 may be integrally formed by molding a worm shaft portion and a rotation shaft portion from one base material.

The worm wheel 45 meshed with the worm shaft 44 is provided with an output shaft 48 at the radial center of the worm wheel 45. The output shaft 48 is arranged coaxially with the direction of the rotation shaft of the worm wheel 45. The output shaft 48 protrudes through the bearing boss 49 of the gear case 40 to the outside of the gear case 40. A spline 48a that can be connected to an electrical component (not shown) is formed at the protruding tip of the output shaft 48.

Furthermore, at the radial center of the worm wheel 45, a sensor magnet (not shown) is provided on a surface opposite to the side from which the output shaft 48 protrudes. This sensor magnet constitutes one of the rotation position detection part 60 that detects the rotation position of the worm wheel 45. A magnetic detection element 61 that constitutes the other of the rotation position detection part 60 is provided on the controller part 4 which is arranged to face the worm wheel 45 on the sensor magnet side (the side of the opening 40a of the gear case 40) of the worm wheel 45.

(Controller Part)

The controller part 4 that controls the drive of the motor part 2 includes a controller board 62 on which the magnetic detection element 61 is mounted, and a cover 63 provided to close the opening 40a of the gear case 40. Then, the controller board 62 is arranged to face the sensor magnet side (the side of the opening 40a of the gear case 40) of the worm wheel 45.

The controller board 62 is a so-called epoxy board on which a plurality of conductive patterns (not shown) are formed. The end portion of the coil 24 drawn from the stator core 20 of the motor part 2 is connected to the controller board 62, and the terminal of the connector (none of which is shown) provided on the cover 63 is electrically connected to the controller board 62. Further, in addition to the magnetic detection element 61, a power module (not shown) composed of a switching element such as a FET (field effect transistor) that controls the current supplied to the coil 24 is mounted on the controller board 62. Furthermore, a capacitor (not shown) or the like that smooths the voltage applied to the controller board 62 is mounted on the controller board 62.

The cover 63 that covers the controller board 62 configured in this way is made of resin. Further, the cover 63 is formed to bulge slightly outward. Then, the inner surface side of the cover 63 is a controller housing portion 56 for housing the controller board 62 or the like. Further, the connector (not shown) is integrally molded on the outer circumferential portion of the cover 63. This connector is formed to be fitted with a connector extending from an external power source (not shown). Then, the controller board 62 is electrically connected to the terminal of the connector (not shown). As a result, the electric power of the external power source is supplied to the controller board 62.

Here, the controller board 62 performs advance angle energization and wide-angle energization at an electric angle θ of 121° to 180° for the coil 24. Further, the controller board 62 applies a drive current with the fifth harmonic superimposed to the coil 24.

Furthermore, on the opening edge of the cover 63, a fitting portion 81 that is fitted with an end of the side wall 40b of the gear case 40 is formed to protrude. The fitting portion 81 is composed of two walls 81a and 81b along the opening edge of the cover 63. Then, the end of the side wall 40b of the gear case 40 is inserted (fitted) between these two walls 81a and 81b. Thus, a labyrinth portion 83 is formed between the gear case 40 and the cover 63. The labyrinth portion 83 prevents dust and water from entering from between the gear case 40 and the cover 63. The gear case 40 and the cover 63 are fixed by fastening bolts (not shown).

(Operation of Wiper Motor)

Next, the operation of the wiper motor 1 will be described. In the wiper motor 1, the electric power supplied to the controller board 62 via a connector 11 is selectively supplied to each coil 24 of the motor part 2 via a power module (not shown). Then, the current flowing through each coil 24 forms a predetermined interlinkage magnetic flux on the stator 8 (teeth 22). This interlinkage magnetic flux generates a magnetic attraction force or a repulsive force (magnet torque) with the effective magnetic flux formed by the permanent magnets 33 of the rotor 9.

Further, the salient pole 35 of the rotor core 32 sets the protruding direction to a direction in which the interlinkage magnetic flux from the stator 8 (teeth 22) tends to flow, and generates a reluctance torque that rotates the rotor core 32 so as to reduce the magnetic resistance (reluctance) of the magnetic path of the interlinkage magnetic flux. The torque and reluctance torque generated by these permanent magnets 33 continuously rotate the rotor 9.

Here, on the tip surface 35b of the salient pole 35 in the rotor core 32 of the rotor 9, the recess 35d is formed at the circumferential center over the entire axial direction. Therefore, the radial interval between the tip surface 35b of the salient pole 35 and the teeth 22 (particularly, the collar portion) of the stator 8 becomes non-uniform. As a result, a sudden change in the magnetic flux density generated in the teeth 22 (particularly, the collar portion) before and after the salient pole 35 passes between the teeth 22 during the rotation of the rotor 9 is suppressed, and a sudden torque fluctuation and an increase in torque ripple of the rotor 9 are suppressed.

Further, the rotor 9 has smaller circumferential rattling of the permanent magnet 33 than the conventional rotor 109. The rotor 9 is rotated in both clockwise and counterclockwise directions as viewed from the axial direction. Thus, even if the rotor 9 is rotated in both directions, the circumferential movement range of the permanent magnet 33 with respect to the rotor core 32 is suppressed as much as possible. Therefore, for example, even if the position of the permanent magnet 33 is displaced and the permanent magnet 33 collides with the salient pole 35 of the rotor core 32, the collision sound is reduced as much as possible.

The rotation of the rotor 9 is transmitted to the worm shaft 44 integrated with the shaft 31, and further transmitted to the worm wheel 45 meshed with the worm shaft 44. Then, the rotation of the worm wheel 45 is transmitted to the output shaft 48 connected to the worm wheel 45, and the output shaft 48 drives a desired electrical component (for example, a wiper).

In addition, a detection signal of the rotation position of the worm wheel 45 detected by the magnetic detection element 61 mounted on the controller board 62 is output to an external device (not shown). The external device (not shown) is a software function unit that functions by executing a predetermined program with a processor such as a CPU (central processing unit). The software function unit is an ECU (electronic control unit) including a processor such as a CPU, a ROM (read only memory) for storing programs, a RAM (random access memory) for temporarily storing data, and an electronic circuit such as a timer. Further, at least a part of the external device (not shown) may be an integrated circuit such as an LSI (large scale integration).

The external device (not shown) controls the switching timing of a switching element or the like of the power module (not shown) based on the rotation position detection signal of the worm wheel 45, and controls the drive of the motor part 2. The output of the drive signal of the power module and the drive control of the motor part 2 may be executed by the controller part 4 instead of the external device (not shown).

As described above, in the rotor 9 of the present embodiment, the arc center C2 of the outer circumferential surface 32*b* of the rotor core 32 is displaced radially outward and off-centered from the rotational axis C1 in a manner that the circumferential center between the circumferentially adjacent salient poles 35 on the outer circumferential surface 32*b* protrudes to the radially outermost side. The permanent magnet 33 is formed in a substantially arc shape as viewed from the axial direction, and is formed line-symmetrically with the circumferential center as the center. In addition, the arc center C3 of the inner circumferential surface 33*b* of the permanent magnet 33 coincides with the arc center C2 of the outer circumferential surface 32*b* of the rotor core 32. Further, the angle θ1 formed by the salient pole side surfaces 35*a* facing each other of the circumferentially adjacent salient poles 35 and the angle θ2 formed by the magnet side surfaces 33*a* on both sides of the permanent magnet 33 in the circumferential direction are set to satisfy the above formula (2). In addition, the distance Lt between the outer circumferential surface 32*b* of the rotor core 32 and the radially outermost end of the salient pole 35 and the distance Lme between the inner circumferential surface 33*b* of the permanent magnet 33 and the radially outermost end of the magnet side surface 33*a* are set to satisfy the above formula (3). Therefore, even if the circumferential width of the permanent magnet 33 is smaller than the width between the circumferentially adjacent salient poles 35 (see the gap S2 in (b) of FIG. 5), the backlash between the salient pole 35 and the permanent magnet 33 prevents the magnet side surface 33*a* from coming into surface contact with the salient pole side surface 35*a*, and only the radially outermost side of the magnet side surface 33*a* comes into contact with the salient pole 35. Therefore, the circumferential movement range of the permanent magnet 33 can be narrowed, and an increase in operating noise and deterioration in rotor characteristics of the rotor 9 can be suppressed.

Further, since the arc center C3 of the inner circumferential surface 33*b* of the permanent magnet 33 is displaced radially outward and off-centered from the rotational axis C1 the position of the inner circumferential surface 33*b* of the permanent magnet 33 of the present embodiment can be set radially outward as compared with the position of the inner circumferential surface 33*b* of the conventional permanent magnet 133 (see the two-dot chain line in (b) of FIG. 5). Correspondingly, the wall thickness on the side of the inner circumferential surface 33*b* of the permanent magnet 33 can be cut as compared with the conventional art, and the radial wall thickness of the permanent magnet 33 can be reduced. Therefore, the material cost for the permanent magnet 33 can be reduced.

In addition, the arc center C4 of the outer circumferential surface 33*c* of the permanent magnet 33 is also displaced radially outward and off-centered from the rotational axis C1. The radial wall thickness Lm at the circumferential center of the permanent magnet 33 is set to satisfy the above formula (3). Therefore, while reducing the material cost for the permanent magnet 33, the outer circumferential surface 33*c* of the permanent magnet 33 can be formed in a manner that the circumferential center protrudes to the radially outermost side, and the rotor characteristics can be improved.

Furthermore, the radius of curvature Ri of the inner circumferential surface 33*b* and the radius of curvature Ro of the outer circumferential surface 33*c* of the permanent magnet 33 are set to satisfy the above formula (1). Therefore, the outer circumferential surface 33*c* of the permanent magnet 33 can be formed into a gentle arc shape, and the inner circumferential surface 33*b* can be formed into a tight arc shape with respect to the outer circumferential surface 33*c*. Thus, the wall thickness on the side of the inner circumferential surface 33*b* of the permanent magnet 33 can be reliably cut as compared with the conventional art. Further, the rotor 9 is rotated in both clockwise and counterclockwise directions as viewed from the axial direction. Thus, even if the rotor 9 is rotated in both directions, the circumferential movement range of the permanent magnet 33 with respect to the rotor core 32 is suppressed as much as possible. Therefore, for example, even if the position of the permanent magnet 33 is displaced and the permanent magnet 33 collides with the salient pole 35 of the rotor core 32, the collision sound can be reduced as much as possible. Therefore, the above configuration can be preferably used for the motor part 2 in which the rotor 9 rotates in both directions.

However, the invention is not limited to the above-described embodiment, and includes various modifications made to the above-described embodiment without departing from the spirit of the invention. For example, in the above-described embodiment, the wiper motor 1 is taken as an example. However, besides the wiper motor 1, the above configuration of the wiper motor 1 can be adopted as a drive source of an electrical component (for example, a power window, a sunroof, an electric seat, etc.) mounted on a vehicle and for various other uses.

Further, the above-described embodiment illustrates that the arc center C4 of the outer circumferential surface 33c of the permanent magnet 33 is also displaced radially outward and off-centered from the rotational axis C1. However, the invention is not limited thereto, and the arc center C4 of the outer circumferential surface 33c of the permanent magnet 33 may not be off-centered.

In addition, the above-described embodiment illustrates that the distance Lt between the outer circumferential surface 32b of the rotor core 32 and the radially outermost end of the salient pole 35, the distance Lme between the inner circumferential surface 33b of the permanent magnet 33 and the radially outermost end of the magnet side surface 33a, and the radial wall thickness Lm at the circumferential center of the permanent magnet 33 are set to satisfy the above formula (3). However, the invention is not limited thereto, and it suffices if at least the distances Lt and Lme are set to satisfy Lme<Lt. With this configuration, the radially outermost side of the magnet side surface 33a can be reliably brought into contact with the salient pole 35.

Further, the above-described embodiment illustrates that the arc center C4 of the outer circumferential surface 33c of the permanent magnet 33 coincides with the arc center C3 of the inner circumferential surface 33b of the permanent magnet 33 and the arc center C2 of the outer circumferential surface 32b of the rotor core 32. However, it suffices if the radius of curvature Ri of the inner circumferential surface 33b and the radius of curvature Ro of the outer circumferential surface 33c of the permanent magnet 33 satisfy the above formula (1), and the arc center C4 of the outer circumferential surface 33c may be displaced radially outward with respect to the arc center C3 of the inner circumferential surface 33b.

What is claimed is:

1. A rotor, comprising:
   a shaft rotating around a rotational axis;
   a rotor core fixed to the shaft and rotating with the rotational axis as a center in a radial direction;
   a plurality of permanent magnets arranged side by side in a circumferential direction on an outer circumferential surface of the rotor core; and
   a plurality of salient poles formed in a rectangular shape that is long in the radial direction as viewed from a direction of the rotational axis, protruding outward in the radial direction from the outer circumferential surface of the rotor core, and arranged between the permanent magnets adjacent to each other in the circumferential direction,
   wherein an arc center of the outer circumferential surface of the rotor core between the plurality of salient poles is displaced outward in the radial direction and off-centered from the rotational axis in a manner that a center in the circumferential direction between the salient poles adjacent to each other in the circumferential direction on the outer circumferential surface of the rotor core protrudes to an outermost side in the radial direction,
   the permanent magnet has an inner circumferential surface in an arc shape on an inner side in the radial direction as viewed from the direction of the rotational axis, and an outer circumferential surface in an arc shape on an outer side in the radial direction as viewed from the direction of the rotational axis, and is formed line-symmetrically with the center in the circumferential direction as a center,
   an arc center of the inner circumferential surface of the permanent magnet is displaced outward in the radial direction and off-centered from the rotational axis so as to correspond to the outer circumferential surface of the rotor core,
   an angle formed by side surfaces facing each other of two salient poles adjacent to each other in the circumferential direction is the same as an angle formed by side surfaces on both sides in the circumferential direction of the permanent magnet facing the side surfaces of the salient poles in the circumferential direction, and
   when a distance between the outer circumferential surface of the rotor core and an outermost end of the salient pole in the radial direction is Lt and a distance between the inner circumferential surface of the permanent magnet and an outermost end in the radial direction on the side surface of the permanent magnet is Lme, the distances Lt and Lme are set to satisfy Lme<Lt.

2. A motor, comprising:
   a stator comprising an annular stator core, and a plurality of teeth protruding inward in the radial direction from an inner circumferential surface of the stator core;
   coils mounted on the teeth; and
   the rotor according to claim 1 arranged on the inner side in the radial direction with respect to the plurality of teeth,
   wherein the rotor is rotated in both clockwise and counterclockwise directions as viewed from the direction of the rotational axis.

3. A wiper motor, comprising:
   the motor according to claim 2; and
   a deceleration part decelerating and outputting rotation of the shaft.

* * * * *